United States Patent [19]

Sugino et al.

[11] Patent Number: 5,554,354
[45] Date of Patent: Sep. 10, 1996

[54] CARBON FIBER-REINFORCED CARBON COMPOSITE MATERIAL AND PROCESS FOR PRODUCING THE SAME

[75] Inventors: Morihiko Sugino; Yoshio Inoue, both of Hyogo-ken, Japan

[73] Assignee: Kabushiki Kaisha Kobe Seiko Sho, Kobe, Japan

[21] Appl. No.: 407,674

[22] Filed: Mar. 21, 1995

Related U.S. Application Data

[63] Continuation of Ser. No. 148,417, Nov. 8, 1993, abandoned, which is a continuation of Ser. No. 841,215, Feb. 27, 1992, abandoned, which is a continuation of Ser. No. 177,089, Apr. 4, 1988, abandoned.

[30] Foreign Application Priority Data

Jan. 22, 1988 [JP] Japan ................... 63-12262

[51] Int. Cl.⁶ ................................ C01B 31/02
[52] U.S. Cl. .................... 428/307.3; 423/445 R; 423/447.2; 264/29.1; 264/29.3; 264/29.5; 428/408
[58] Field of Search ................ 423/445, 447.2, 423/449; 264/29.1, 29.3, 29.5

[56] References Cited

U.S. PATENT DOCUMENTS

| | | | |
|---|---|---|---|
| 3,628,984 | 12/1971 | Ishikawa et al. | 423/449 |
| 3,718,720 | 2/1973 | Lambdin et al. | 423/449 |
| 3,814,642 | 6/1974 | Araki et al. | 423/449 |
| 3,917,884 | 11/1975 | Jahn | 423/449 |
| 3,925,587 | 12/1975 | Park | 423/447.6 |
| 3,936,535 | 2/1976 | Border | 264/29.5 |
| 3,969,124 | 7/1976 | Stewart | 423/449 |
| 4,026,998 | 5/1977 | Jorro et al. | 423/445 |
| 4,100,314 | 7/1978 | Wallouch | 423/449 |
| 4,205,055 | 5/1980 | Maire et al. | 423/449 |
| 4,225,569 | 9/1980 | Matsui et al. | 423/445 |
| 4,761,272 | 8/1988 | Hucke | 423/445 |

FOREIGN PATENT DOCUMENTS

| | | | |
|---|---|---|---|
| 49-32701 | 9/1974 | Japan | 423/449 |
| 57-027746 | 2/1982 | Japan . | |
| 59-107913 | 6/1984 | Japan | 423/449 |
| 60-54270 | 3/1985 | Japan . | |
| 62-7668 | 1/1987 | Japan . | |
| 62-138361 | 6/1987 | Japan . | |

*Primary Examiner*—Robert Kunemund
*Attorney, Agent, or Firm*—Oblon, Spivak, McClelland, Maier & Neustadt, P.C.

[57] ABSTRACT

Disclosed herein is a carbon fiber-reinforced carbon composite material which comprises a carbon fiber reinforcement in the form of nonwoven fabric and a matrix composed of an adhesion promoting phase of vitreous carbon and a filling phase of soft carbon or fine mosaic carbon. It has a high density, high strength, good frictional properties, and high wear resistance.

5 Claims, 3 Drawing Sheets

5,554,354

CARBON FIBER-REINFORCED CARBON COMPOSITE MATERIAL AND PROCESS FOR PRODUCING THE SAME

This is a continuation of application Ser. No. 08/148,417 filed on Nov. 8, 1993 now abandoned, which is a continuation of Ser. No. 07/841,215 filed on Feb. 27, 1992 now abandoned, which is a continuation of Ser. No. 07/177,089 filed on Apr. 4, 1988 now abandoned.

BACKGROUND OF THE INVENTION

1. Field of the Invention

The present invention relates to a carbon fiber-reinforced carbon composite material which is composed of a matrix of carbonaceous material and a reinforcing material of carbon fiber in the form of nonwoven fabric.

2. Description of the Prior Art

Carbon fiber-reinforced carbon composite material is referred to as C/C composite material. It is used as a heat-resistant material in the fields of spacecraft and aircraft. The C/C composite material is produced in the following manner. At first, a preform of nonwoven fabric or woven fabric is impregnated with pitch or a thermosetting resin such as phenolic resin, furan resin, and epoxy resin, thereby to form a prepreg. A plurality of the prepregs are laminated on top of the other to form a multi-layer product. The layers are made into a unified body by press molding or the like. The unified body is calcined so that the matrix resin is carbonized and graphitized. If necessary, the impregnation and calcination are repeated to increase the density of the composite material. The density increase is also accomplished by chemical vapor deposition (referred to as CVD hereinafter).

Increasing the density to a desired value by repeating impregnation or by performing CVD takes a long time because closed voids are formed in the matrix (depending on the type of the matrix carbon) or pores are nearly closed to prevent the impregnation.

Hard carbon is usually made from a thermosetting resin. A disadvantage of hard carbon is that it forms voids while it undergoes impregnation repeatedly and voids prevent the increase of density. By contrast, soft carbon is made from a thermoplastic resin, pitch, or coke. A disadvantage of these materials is that their conversion into carbon is usually low, e.g., 60% at the highest, and repetition is required to achieve the desired conversion. An additional disadvantage is that they do not permeate small pores easily.

One disadvantage involved in C/C composite materials is that an impregnant or coating fluid such as thermosetting resin does not infiltrate into individual yarns constituting the nonwoven fabric or woven fabric. Each yarn is a collection of 1000 to 4000 fine long filaments. This leads to delamination and cracking at the interface between the matrix and the reinforcement fiber that take place after carbonization and calcination. Another disadvantage of C/C composite materials is that there is locally unbalanced strength which causes delamination and deformation during the use of C/C composite material.

In order to eliminate these disadvantages, there was developed a C/C composite material produced from a prepreg composed of a matrix of thermosetting resin and a reinforcing material of short carbon fiber. Unfortunately, this C/C composite material is poor in strength and impact resistance because the fiber-to-matrix ratio is small and individual fibers are arranged apart. An additional disadvantage of the C/C composite material based on a short fiber reinforcing material is that the strength in the direction parallel to the surface is low as compared with that in the direction perpendicular to the surface.

A C/C composite material used as a friction material is required to have not only frictional properties but also high strength, oxidation resistance, and thermal conductivity, because it receives texture, compression, and shocks during its use. However, frictional properties are not compatible with strength or oxidation resistance. For a C/C composite material to have improved frictional properties, it should have a crystalline structure, which is formed by heat treatment (or graphitization) at 2500° C. or above.

The relationship between the heat treatment temperature and the characteristic properties (strength, frictional properties, and oxidation resistance) is graphically shown in FIG. 5. It is noted from FIG. 5 that raising the heat treatment temperature to improve the frictional properties lowers the mechanical strength. Thus it is difficult to improve both the frictional properties and the strength at the same time.

By the same token, raising the heat treatment temperature improves oxidation resistance but lowers strength on account of the carbonization accompanied by increased pores. Thus the improvement of oxidation resistance by heat treatment alone is limited. According to the prior art, the desired oxidation resistance was achieved by the application of an oxidation resistant coating instead of heat treatment at high temperatures.

The C/C composite material is composed of carbon fiber as a reinforcing material and carbon as a matrix. The carbon fiber as a reinforcing material is broadly classified into PAN (polyacrylonitrile)-based one and pitch-based one. The former is in general use where high strength is required. A disadvantage of PAN-based carbon fiber is that it is not wetted by the matrix very easily. Therefore, surface modification at the sacrifice of strength is under study.

Since carbon fiber is used in the form of tow, PAN-based carbon fibers having a low modulus are made into a fiber bundle by the aid of a sizing agent. This sizing agent deteriorates the wettability of the carbon fibers.

The impregnation of the matrix is limited by many factors. First, the impregnant is required to contain no granular, solid, or gel-like substances. Second, the impregnant is required to have a low viscosity and to be highly compatible with carbon fibers or carbon fiber bundles.

SUMMARY OF THE INVENTION

The present invention was completed to solve the above-mentioned problems. Accordingly, it is an object of the present invention to provide a carbon fiber-reinforced carbon composite material having a high density, high strength, good frictional properties, and high wear resistance.

DETAILED DESCRIPTION OF THE INVENTION

The carbon fiber-reinforced carbon composite material pertaining to the present invention comprises a carbon fiber reinforcement in the form of nonwoven fabric and a matrix composed of an adhesion promoting phase of vitreous carbon and a filling phase of soft carbon or fine mosaic carbon.

According to the present invention, it is possible to control the characteristic properties of the carbon fiber-reinforced carbon composite material by properly adjusting the content of carbon fiber and the ratio of soft carbon to vitreous carbon.

Carbon fiber, vitreous carbon (or hard carbon), and soft carbon (or fine mosaic carbon) are associated with the characteristic properties of the composite material they constitute as follows:

(1) Carbon fiber: contributes to mechanical strength, sliding properties, thermal properties, and electrical properties.

(2) Vitreous carbon: contributes to mechanical strength.

(3) Soft carbon or fine mosaic carbon: contributes to sliding properties, thermal properties, and electrical properties.

According to the process of the invention, an impregnant is prepared from a raw material which forms soft carbon or hard carbon, and the impregnant is applied to a nonwoven fabric of carbon fiber. The impregnant forms the fine mosaic construction common to the adhesion promoting phase and the filling phase. Not only does this simplify the production process but it also provides a composite material having characteristic properties better than those the matrixes possess individually.

EXAMPLES

Figure 1:
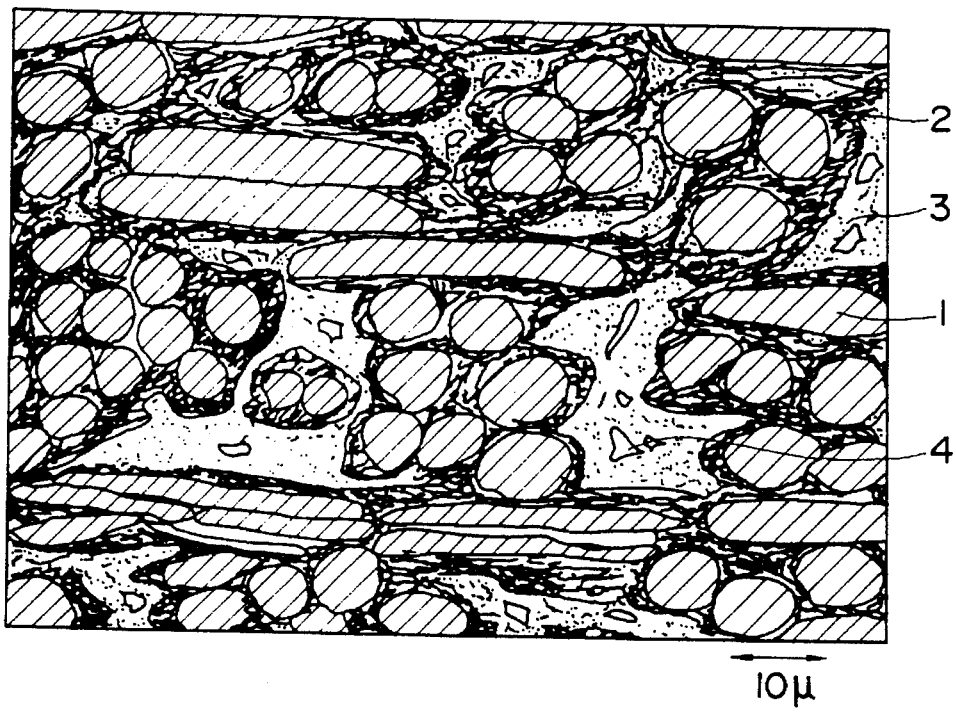
FIG. 1 is a schematic diagram showing the construction of the C/C composite material obtained in the example of the present invention.

The examples of the invention will be explained with reference to the accompanying drawings. FIG. 1 is a schematic diagram showing the construction of the C/C composite material obtained in the example. (This schematic diagram was prepared by tracing a photomicrograph.) There is shown a carbon fiber 1 as a reinforcement, and there is shown an adhesion promoting phase 2 of vitreous carbon surrounding the carbon fiber. There is also shown a filling phase 3 of soft carbon or fine mosaic carbon which fills the space surrounded by the adhesion promoting phase. The filling phase 3 contains voids 4.

The C/C composite material of the present invention contains as a reinforcement carbon fibers in the form of nonwoven fabric. This nonwoven fabric is made of a 9:1 blend of carbon fiber and polyvinyl chloride fiber to cope with the matrix shrinkage which occurs during heat treatment. In addition, the nonwoven fabric undergoes needle punching so that carbon fibers are distributed in the thickness direction.

The C/C composite material of the present invention contains a matrix which is composed of an adhesion promoting phase 2 of vitreous carbon and a filling phase 3 of soft carbon or fine mosaic carbon. The adhesion promoting phase 2 is formed from a thermosetting resin typified by phenolic resin. It contributes to the mechanical strength of the C/C composite material.

The thermosetting resin is previously mixed with a raw material which changes into soft carbon at the time of impregnation. In other words, the thus prepared impregnant contains components for both soft carbon and hard carbon. The combination of the two components produces better characteristic properties than they produce individually, as shown in FIG. 2.

Figure 2:
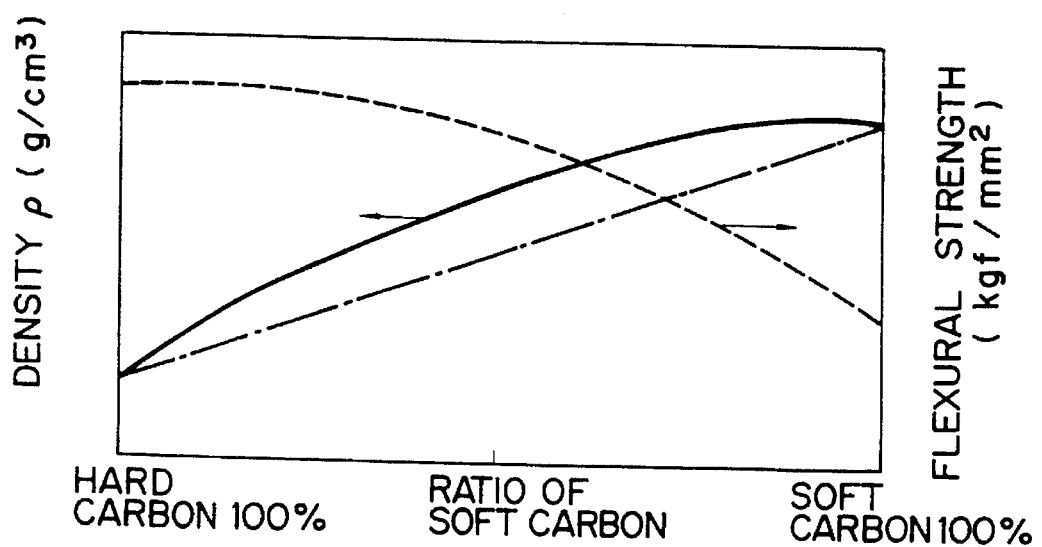
FIG. 2 is a graph showing the relationship between the ratio of soft carbon and the density.

In FIG. 2, the abscissa represents the ratio of hard carbon to soft carbon in the mixture, and the ordinate represents the density and flexural strength of the C/C composite material. In other words, FIG. 2 is a graph showing the relationship between the ratio of soft carbon and the density and flexural strength. It is noted from FIG. 2 that the actual density (indicated by the solid line) is higher than the theoretical density (indicated by the alternate long and short dash line) calculated from the proportional allotment of the density of soft carbon and the density of hard carbon. With the increase of hard carbon, the flexural strength (indicated by the broken line) increases. These data suggest that soft carbon and hard carbon provide better characteristic properties when used in combination than when used individually.

The increase of density as shown in FIG. 2 leads to the increase of strength in the case of C/C composite material if the content (vol %) of carbon fiber is constant.

According to the process of the invention, the reinforcement of carbon fiber in the form of nonwoven fabric is impregnated with a mixture composed of a raw material for soft carbon and a raw material for hard carbon. The resulting preform is subsequently calcined in an inert atmosphere (argon or nitrogen) at 70 kgf/cm$^2$ or above and 400° C. or above.

Figure 3:
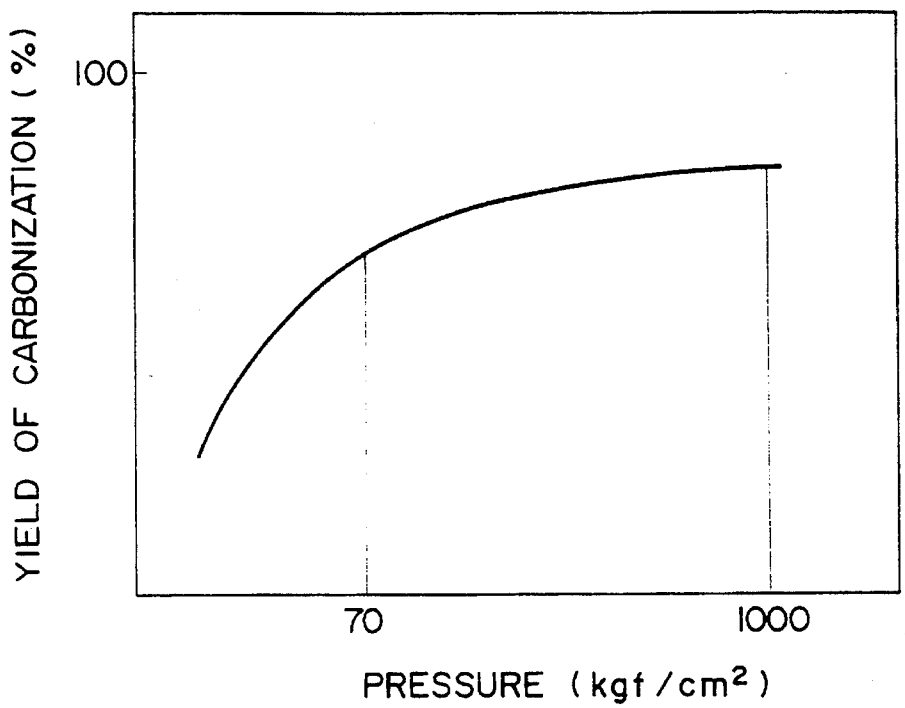
FIG. 3 is a graph showing the relationship between the pressure and the yield of carbonization.

The yield of carbonization (ordinate) is plotted against the pressure (abscissa) in FIG. 3. It is noted from FIG. 3 that the yield of carbonization extremely increases when the calcination pressure is higher than 70 kgf/cm$^2$. The reason for this is considered as follows: The preform is compressed in the argon or nitrogen atmosphere at a high pressure. As the preform is heated, the resin in the preform undergoes polycondensation, releasing functional groups from the carbon skeletons. The released groups, however, are prevented from gasification by the external pressure. As the preform is heated further, the released groups decompose into molecules of small molar volume such as methane and hydrogen. Consequently, hydrogen alone dissipates through fine pores which do not permit the passage of argon or nitrogen, with the result that carbonization proceeds, leaving a large amount of carbon in the carbonizable substance (with a high yield of carbonization). Thus, the resulting carbon material has a high density. This effect is prominent when calcination is carried out at a pressure of 70 kgf cm$^2$ or above and at a temperature of 400° C. or above. This is the reason why the pressure and temperature for calcination should be set up as mentioned above.

In the meantime, the calcination at a temperature below 400° C. does not necessarily need a high pressure. Therefore, the preform can be calcined as follows: At first, the preform is heated up to about 400° C. under normal pressure. Then it is rapidly heated up to about 400° C. under a high pressure. Subsequently, the temperature is raised at a low rate of 200° C./h during calcination. This procedure reduces the cycle time.

The ratio of hard carbon to soft carbon is associated with the characteristic properties of the composite material. With the ratio higher than 3/7, the strength is low, and with the ratio higher than 7/3, the sliding characteristics are poor, in the case where the content of carbon fiber is fixed at 40%.

To provide the desired strength and sliding characteristics, the ratio of hard carbon to soft carbon (or fine mosaic carbon) should be in the range of 3/7 to 7/3.

Figure 4:
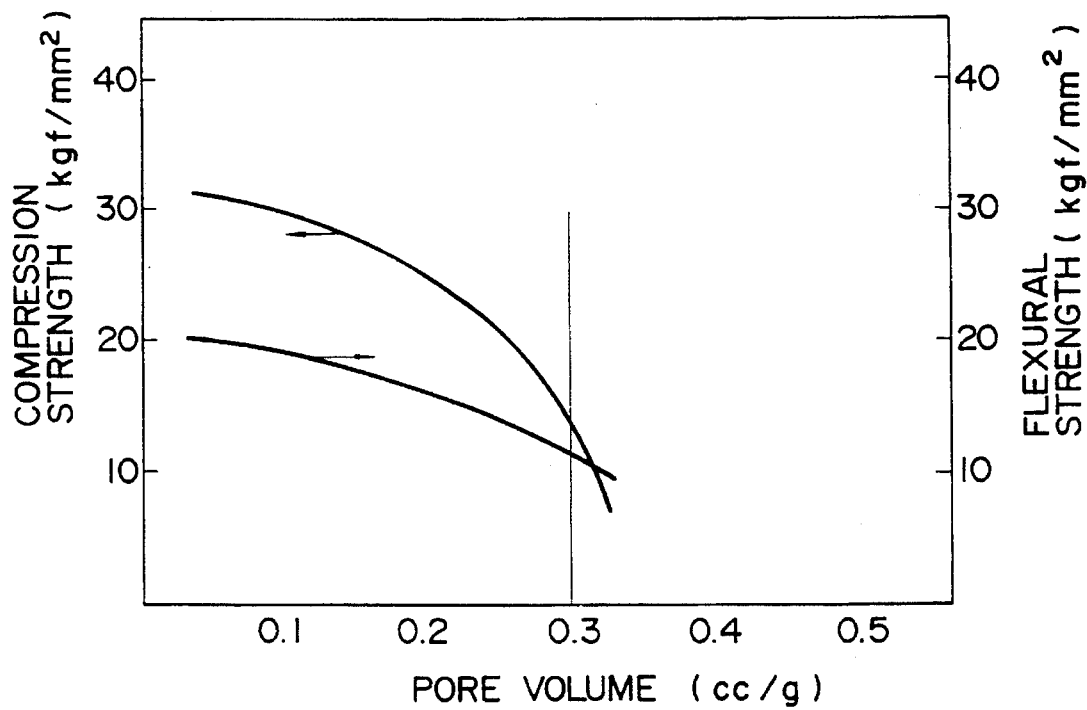
FIG. 4 is a graph showing the relationship between the compression strength and the pore volume and also showing the relationship between the flexural strength and the pore volume.
Figure 5:
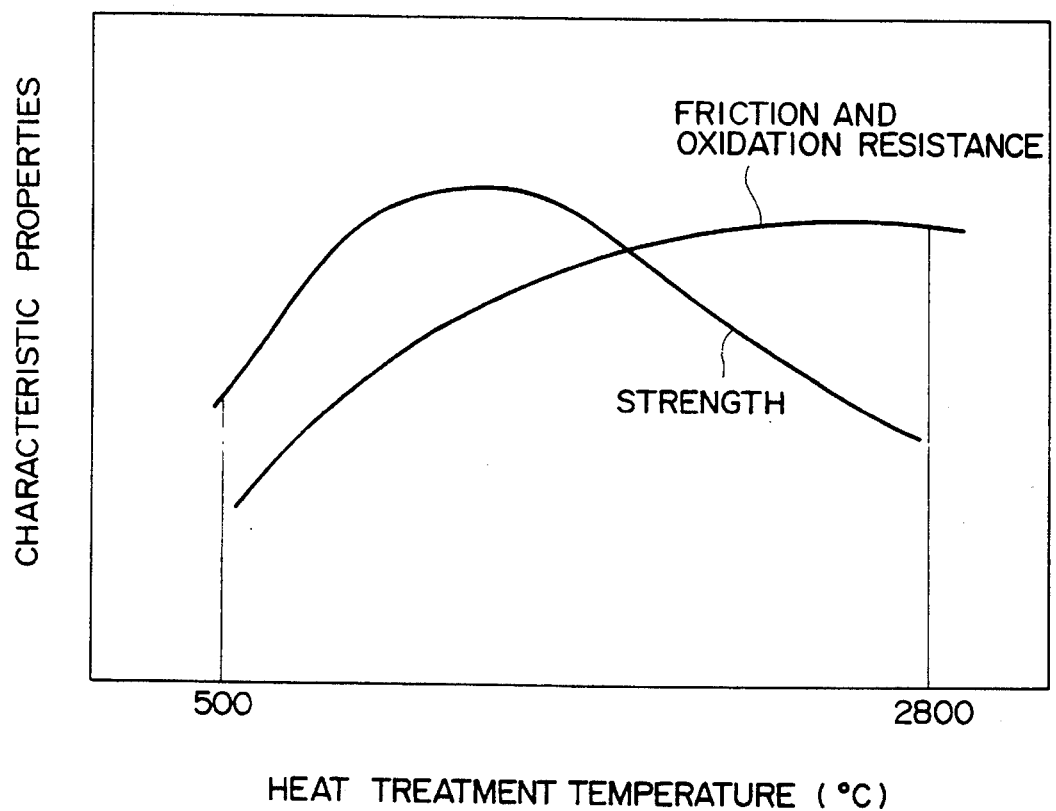
FIG. 5 is a graph showing the relationship between the heat treatment temperature and the characteristic properties.

According to the process of the invention, it is possible to control the open pores in the composite material such that open pores having an average diameter larger than 10 μm account for less than 30% and the volume of open pores is less than 0.3 cc/g. The thus controlled open pores contribute to the greatly improved strength and wear resistance of the composite material. This is shown by FIG. 4 in which the compression strength and flexural strength are plotted against the volume of open pores. It is noted from FIG. 4 that with a pore volume less than 0.3 cc/g, the composite material has a high compression strength and flexural strength, which are desirable for the composite material as a heat resistant material.

In the examples, the C/C composite materials were prepared and the physical properties of the resulting composite materials were measured. The manufacturing conditions and the physical properties measured are shown in Table 1. The impregnant was a thermosetting resin of high solid content (70%) which gives a high yield of carbonization. The product obtained by impregnation and carbonization had a pore diameter smaller than 10 μm. The second and subsequent impregnation was performed under a high pressure of 1000 kgf/cm$^2$. The filling phase of soft carbon was produced from pitch. For the increased yield of carbonization, impregnation and carbonization were performed under a pressure of 1000 kgf/cm$^2$. The final heat treatment was performed at 2000° C. Before impregnation with pitch, the pore ratio was controlled by regulating the concentration and/or amount of the impregnant. In other words, the solid content of the impregnant was set at four levels of 80%, 70%, 60%, and 50%, so that the ratio of vitreous carbon and soft carbon was changed. The content of carbon fiber was fixed at 40%.

It is noted from Table 1 that the samples in Examples 1 to 4 are superior to the samples in Comparative Examples 1 and 2 in all of density, strength, friction properties, and abrasion wear.

The adhesion of the adhesion promoting phase to the carbon fibers is enhanced if the sizing agent is selected from the same group as the adhesion promoting phase and the impregnation is performed at a high pressure.

Soft carbon in the filling phase can be graphitized at a temperature below 2000° C. because the composite material is heat-treated at 1200° C. or above under a high pressure after densification. (Graphitization under normal pressure requires a high temperature above 2500° C.) Good characteristic properties (friction properties, strength, and oxidation resistance) are obtained at a comparatively low temperature.

As mentioned above, the carbon fiber-reinforced carbon composite material has a high density, high strength, good frictional properties, and high wear resistance, because it contains a carbon fiber reinforcement in the form of non-woven fabric and a matrix composed of an adhesion promoting phase of vitreous carbon and a filling phase of soft carbon or fine mosaic carbon.

The carbon fiber-reinforced carbon composite material of the present invention has a specific heat of 0.10 to 0.30 cal/g°C. at room temperature, a flexural strength of 10 to 50 kgf/mm$^2$, a flexural modulus of $2\times10^3$ to $10\times10^3$ kgf/mm$^2$, a dynamic coefficient of friction of 0.2 to 0.6, and a compression strength higher than 10 kgf/mm$^2$. The flexural strength in the thickness direction is 70 to 150% higher than that in the surface direction.

What is claimed is:

1. A carbon fiber-reinforced carbon composite material having a dynamic coefficient of friction of 0.2 to 0.6 prepared by a process comprising:

impregnating a non-woven fabric of carbon fiber or blend of carbon fiber and an organic fiber, said non-woven fabric having undergone needle punching so that the carbon fibers are distributed in the thickness direction of the fabric, with a thermosetting resin and pitch or a pitch-containing thermosetting resin, thereby forming a prepreg; and heating the prepreg to calcine the same at a temperature above 400° C. in an inert gas atmosphere under a

TABLE 1

| Example No. | Resin solids (%) | Pitch impregnation (times) | Hard/soft ratio | Density (g/cm$^3$) | Flexural strength (kgf/mm$^2$) | Coefficient of friction (μ) | Abrasion wear (%) | Temperature at TG10% (°C.) |
|---|---|---|---|---|---|---|---|---|
| 1 | (once) 60 | 2 | 3/7 | 1.55 | 12 | 0.3 | 0.004 | 825 |
| 2 | (twice) 70 | 2 | 1/1 | 1.50 | 14 | 0.35 | 0.01 | 820 |
| 3 | (thrice) 80 | 2 | 7/3 | 1.60 | 20 | 0.4 | 0.05 | 810 |
| 4 | (once) 50 | 2 | 2/8 | 1.60 | 10 | 0.25 | 0.003 | 830 |
| 1* | (5 times) 80 | 0 | 10/0 | 1.35 | 15 | 0.7 | 0.09 | 780 |
| 2* | — | 5 | 0/10 | 1.60 | 5 | 0.2 | 0.002 | 830 |

The number of times of impregnation is given in the parentheses.
*Comparative Examples "TG10%" is a measure to evaluate the oxidation of a C/C composite material in the atmosphere. It is represented by a temperature at which a sample loses 10% of its weight when it is heated at a rate of 10° C./min in an air flow of 200 liters/min.

pressure greater than 70 kgf/cm$^2$ to form said carbon composite material of said non-woven fabric in a matrix composed of an adhesion-promoting vitreous carbon phase and a soft carbon or fine mosaic carbon filling phase.

2. The carbon fiber-reinforced carbon composite material of claim 1, wherein the adhesion-promoting vitreous carbon phase and the soft carbon or fine mosaic carbon filling phase are present in a ratio ranging from 7:3 to 3:7.

3. The carbon fiber-reinforced carbon composite material of claim 1, which contains open pores having an average pore diameter of 1–10 μm, said open pores accounting for more than 70% by volume of all of the open pores.

4. The carbon fiber-reinforced carbon composite material of claim 1, which contains open pores whose volume is less than 0.3 cc/g as measured by mercury porosimetry.

5. The carbon fiber-reinforced carbon composite material of claim 1, wherein the prepreg undergoes preliminary calcination at a temperature below 400° C. under normal pressure.

* * * * *